United States Patent
Ruan et al.

(10) Patent No.: US 10,875,958 B2
(45) Date of Patent: Dec. 29, 2020

(54) METHOD FOR SYNTHESIZING POLYBUTYLENE ADIPATE TEREPHTHALATE-POLYLACTIC ACID (PBAT-PLA) COPOLYESTER

(71) Applicant: Henan Green Polymer Co., Ltd, Henan (CN)

(72) Inventors: Liuwen Ruan, Jiangsu (CN); Wanxin Li, Jiangsu (CN); Yongbin Tang, Jiangsu (CN); Xinyu He, Jiangsu (CN); Wenjun Yang, Jiangsu (CN); Bin Mao, Jiangsu (CN)

(73) Assignee: Henan Green Polymer Co., Ltd, Puyang (CN)

( * ) Notice: Subject to any disclaimer, the term of this patent is extended or adjusted under 35 U.S.C. 154(b) by 36 days.

(21) Appl. No.: 16/314,404

(22) PCT Filed: Aug. 29, 2017

(86) PCT No.: PCT/CN2017/099437
§ 371 (c)(1),
(2) Date: Dec. 29, 2018

(87) PCT Pub. No.: WO2019/010767
PCT Pub. Date: Jan. 17, 2019

(65) Prior Publication Data
US 2019/0330416 A1   Oct. 31, 2019

(30) Foreign Application Priority Data
Jul. 11, 2017   (CN) .......................... 2017 10 559728

(51) Int. Cl.
*C08G 63/08* (2006.01)
*C08G 63/183* (2006.01)
(Continued)

(52) U.S. Cl.
CPC .......... *C08G 63/08* (2013.01); *C08G 63/183* (2013.01); *C08G 63/60* (2013.01); *C08G 63/823* (2013.01); *C08G 63/85* (2013.01)

(58) Field of Classification Search
None
See application file for complete search history.

(56) References Cited

FOREIGN PATENT DOCUMENTS

| CN | 102199279 A | 9/2011 |
|---|---|---|
| CN | 102838734 A | 12/2012 |

(Continued)

OTHER PUBLICATIONS

Coltelli et al (Compatible blends of biorelated polyesters through catalytic transesterification in the melt, Polymer Degradation and Stability 96 (2011) 982-990). (Year: 2011).*

*Primary Examiner* — Rachel Kahn

(57) ABSTRACT

A method for synthesizing a polybutylene adipate terephthalate-polylactic acid (PBAT-PLA) copolyester, the method including: uniformly blending a first prepolymer PBAT and a second prepolymer PLA to yield a mixture, 0putting the mixture in a vacuum reactor with a vacuum degree of between 5 and 100 pascal, heating the vacuum reactor to a temperature of between 100 and 110° C., and allowing to react for between 0.5 and 1 hr; stepwise increasing the temperature to be between 145 and 155° C. in between 1 and 2 hrs, and allowing to react for between 5 and 10 hrs, to yield a PBAT-PLA copolyester with a weight-average molecular weight of between 100000 and 250000. The method for synthesizing the PBAT-PLA copolyester is eco-friendly, non-toxic and cost-efficient.

12 Claims, 1 Drawing Sheet

(51) Int. Cl.
*C08G 63/60* (2006.01)
*C08G 63/82* (2006.01)
*C08G 63/85* (2006.01)

(56) References Cited

FOREIGN PATENT DOCUMENTS

| | | | |
|---|---|---|---|
| CN | 103788346 A | | 5/2014 |
| CN | 105778449 A | * | 7/2016 |

* cited by examiner

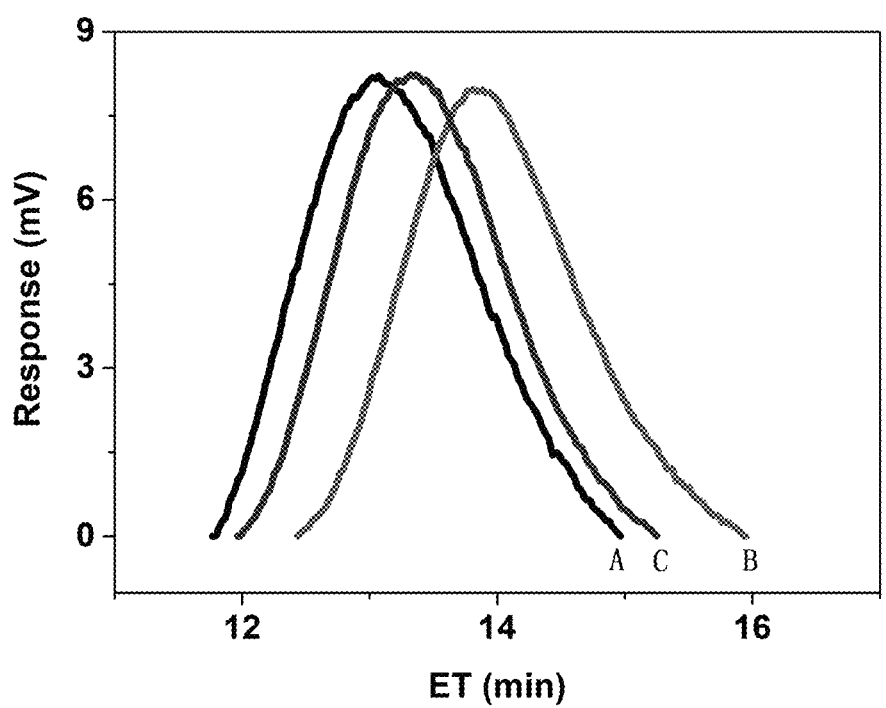

METHOD FOR SYNTHESIZING POLYBUTYLENE ADIPATE TEREPHTHALATE-POLYLACTIC ACID (PBAT-PLA) COPOLYESTER

FIELD OF THE INVENTION

The disclosure belongs to the field of biodegradable materials, and more particularly to a method for synthesizing a polybutylene adipate terephthalate-polylactic acid (PBAT-PLA) copolyester.

BACKGROUND OF THE INVENTION

With advantages of resource reproducibility, biodegradability, biocompatibility, processability, and transparency, polylactic acid (PLA) is regarded as one of the most promising eco-friendly materials of bio-chemical synthetic polymers in the century.

However, polylactic acid has disadvantages such as low elongation at break, poor impact strength and poor toughness, lack of elasticity and flexibility, so that it fails to meet some practical requirements, which limits the application thereof. Therefore, toughening modification of PLA is needed. Traditional methods include physical modification and chemical modification.

In the prior art, to increase the elongation, impact strength and toughness of PLA, PBAT and PLA are directly blended and processed to yield a PBAT-PLA polymer blend. In one copolymerization method of PBAT-PLA, the toxic diisocyanate group is employed as a chain extender, which limits the popularization and application of the method. In another copolymerization method, a hydroxyl polymer is employed to trigger the ring opening reaction of the lactide; however, the lactide requires purifying, which is costly.

SUMMARY OF THE INVENTION

In view of the above-described problems, it is an objective of the invention to provide a method for synthesizing a polybutylene adipate terephthalate-polylactic acid (PBAT-PLA) copolyester that is eco-friendly, non-toxic and cost-efficient.

To achieve the above objective, according to one embodiment of the invention, there is provided a method for synthesizing a polybutylene adipate terephthalate-polylactic acid (PBAT-PLA) copolyester, which is achieved according to the following technical solutions:

A method for synthesizing a polybutylene adipate terephthalate-polylactic acid (PBAT-PLA) copolyester, comprises:
uniformly blending a first prepolymer PBAT and a second prepolymer PLA to yield a mixture, putting the mixture in a vacuum reactor with a vacuum degree of between 5 and 100 pascal, heating the vacuum reactor to a temperature of between 100 and 110° C., and allowing to react for between 0.5 and 1 hr; stepwise increasing the temperature to be between 145 and 155° C. in between 1 and 2 hrs, and allowing to react for between 5 and 10 hrs, to yield a PBAT-PLA copolyester with a weight-average molecular weight of between 100000 and 250000.

Preferably, a weight ratio of the first prepolymer PBAT to the second prepolymer PLA is 1-10:1-10.

Preferably, the first prepolymer PBAT is prepared as follows: adding adipic acid, dimethyl terephthalate, and 1,4-butanediol in a molar ratio thereof of 1-2:1-2:2-4 to a reactor, charging nitrogen to the reactor, and heating the reactor to a temperature of between 140 and 160° C.; allowing materials in the reactor to melt, and adding a catalyst A; vacuumizing the reactor to a pressure of 0.02-0.06 megapascal, and allowing to react for 1-2 hrs; stepwise increasing the temperature to be between 210 and 230° C. in between 1 and 2 hrs, controlling the vacuum degree at between 500 and 1000 pascal, allowing to react for 1-5 hrs, to yield the first prepolymer PBAT.

Preferably, an addition amount of the catalyst A accounts for 0.01-0.5% of that of reactants in the reactor by weight.

Preferably, the catalyst A is a titanium-containing catalyst which is selected from tetrabutyl titanate, tetraethyl titanate, tetraisopropyl titanate, titanium chloride, titanium dioxide, or a mixture thereof.

Preferably, the catalyst A is tetrabutyl titanate.

Preferably, the second prepolymer PLA is prepared as follows: adding L-lactic acid to a reactor, performing nitrogen replacement three times, heating the reactor to a temperature of between 110 and 130° C., vacuumizing the reactor to a pressure of 0.02-0.08 megapascal, and stirring for 1-4 hrs; adding a composite catalyst B to the reactor, stepwise increasing the temperature to be between 160 and 190° C. in between 1 and 2 hrs, continuing vacuumizing the reactor to a pressure of between 500 and 1000 pascal, allowing to react for 1-5 hrs, to yield the second prepolymer PLA.

Preferably, the composite catalyst B comprises a primary catalyst and a cocatalyst with a molar ratio thereof of 1:1, and an addition amount of the primary catalyst accounts for 0.01-0.5% of that of reactants by weight.

Preferably, the primary catalyst is a tin-containing catalyst or a zinc-containing catalyst; the tin-containing catalyst is selected from stannous octoate, stannous chloride dihydrate, stannous oxide, stannous chloride, tetraphenyl tin, or a mixture thereof; the zinc-containing catalyst is selected from zinc powder, diethyl zinc, zinc octoate, zinc oxide, zinc chloride, or a mixture thereof; the cocatalyst is one or more organic sulfonic compounds selected from mesylate, ethanesulfonic acid, 1-propanesulfonic acid, p-toluenesulfonic acid and p-chlorobenzenesulfonic acid.

Preferably, the primary catalyst is stannous chloride dihydrate, and the cocatalyst is p-toluenesulfonic acid.

The method of the disclosure for synthesizing a polybutylene adipate terephthalate-polylactic acid (PBAT-PLA) copolyester comprises putting the PBAT and the PLA to a high vacuum reactor, and controlling the vacuum degree of the reactor, to synthesize a PBAT-PLA copolyester with a weight-average molecular weight of between 100000 and 250000. Compared with the existing technology that employs diisocyanate to trigger the chain-extension reaction between the PBAT and the PLA to yield a copolymer, the method of the disclosure directly polymerizes the first prepolymer PBAT and the second prepolymer PLA to yield the PBAT-PLA copolyester under the vacuum degree of 5-100 pascal, involving no chain extender such as diisocyanate and any solvent, thus preventing the damage to the environment and human beings caused by the diisocyanate and solvent. In addition, compared with the existing technology that requires the ring opening of the lactide, the method of the disclosure is cost-efficient.

BRIEF DESCRIPTION OF THE DRAWINGS

FIG. 1 illustrates a gel permeation chromatograph representing the molecular weight of PBAT-PLA copolyesters prepared in Examples 1-3 of the disclosure.

DETAILED DESCRIPTION OF THE EMBODIMENTS

To further illustrate the invention, experiments detailing a method for synthesizing a polybutylene adipate terephthalate-polylactic acid (PBAT-PLA) copolyester are described below. It should be noted that the following examples are intended to describe and not to limit the invention.

The disclosure provides a method for synthesizing a polybutylene adipate terephthalate-polylactic acid (PBAT-PLA) copolyester, the method comprising: uniformly blending a first prepolymer PBAT and a second prepolymer PLA to yield a mixture, putting the mixture in a vacuum reactor with a vacuum degree of between 5 and 100 pascal, heating the vacuum reactor to a temperature of between 100 and 110° C., and allowing to react for between 0.5 and 1 hr; stepwise increasing the temperature to be between 145 and 155° C. in between 1 and 2 hrs, and allowing to react for between 5 and 10 hrs, to yield a PBAT-PLA copolyester with a weight-average molecular weight of between 100000 and 250000. Specifically, the vacuum degree is preferably controlled at between 20 and 80 pascal, and more preferably, at between 40 and 60 pascal.

In the copolymerization of the disclosure, the weight ratio of the first prepolymer PBAT to the second prepolymer PLA is 1-10:1-10.

The first prepolymer PBAT is prepared as follows: adding adipic acid, dimethyl terephthalate, and 1,4-butanediol in a molar ratio thereof of 1-2:1-2:2-4 to a reactor, charging nitrogen to the reactor, and heating the reactor to a temperature of between 140 and 160° C.; allowing materials in the reactor to melt, and adding a catalyst A; vacuumizing the reactor to a pressure of 0.02-0.06 megapascal, and allowing to react for 1-2 hrs; stepwise increasing the temperature to be between 210 and 230° C. in between 1 and 2 hrs, controlling the vacuum degree at between 500 and 1000 pascal, allowing to react for 1-5 hrs, to yield the first prepolymer PBAT with a weight-average molecular weight of between 40000 and 90000.

Specifically, the addition amount of the catalyst A accounts for 0.01-0.5% of that of reactants in the reactor by weight.

Specifically, the catalyst A is a titanium-containing catalyst which is selected from tetrabutyl titanate, tetraethyl titanate, tetraisopropyl titanate, titanium chloride, titanium dioxide, or a mixture thereof. Preferably, the catalyst A is tetrabutyl titanate.

The second prepolymer PLA is prepared as follows: adding L-lactic acid to a reactor, performing nitrogen replacement three times, heating the reactor to a temperature of between 110 and 130° C., vacuumizing the reactor to a pressure of 0.02-0.08 megapascal, and stirring for 1-4 hrs; adding a composite catalyst B to the reactor, stepwise increasing the temperature to be between 160 and 190° C. in between 1 and 2 hrs, continuing vacuumizing the reactor to a pressure of between 500 and 1000 pascal, allowing to react for 1-5 hrs, to yield the second prepolymer PLA with a weight-average molecular weight of between 30000 and 80000.

Specifically, the composite catalyst B comprises a primary catalyst and a cocatalyst with a molar ratio thereof of 1:1, and the addition amount of the primary catalyst accounts for 0.01-0.5% of that of reactants by weight.

Specifically, the primary catalyst is a tin-containing catalyst or a zinc-containing catalyst; the tin-containing catalyst is selected from stannous octoate, stannous chloride dihydrate, stannous oxide, stannous chloride, tetraphenyl tin, or a mixture thereof; the zinc-containing catalyst is selected from zinc powder, diethyl zinc, zinc octoate, zinc oxide, zinc chloride, or a mixture thereof; the cocatalyst is one or more organic sulfonic compounds selected from mesylate, ethanesulfonic acid, 1-propanesulfonic acid, p-toluenesulfonic acid and p-chlorobenzenesulfonic acid.

Preferably, the primary catalyst is stannous chloride dihydrate, and the cocatalyst is p-toluenesulfonic acid.

To further illustrate the disclosure, the method for synthesizing a polybutylene adipate terephthalate-polylactic acid (PBAT-PLA) copolyester is described in detail below in conjunction with examples.

Example 1

A. 146 g of adipic acid, 194 g of dimethyl terephthalate, and 216 g of 1,4-butanediol were added to a reactor. The reactor was protected by nitrogen and heated to 140° C. After the reactants in the reactor were melted completely, 0.556 g of tetrabutyl titanate was added. The reactor was vacuumized to the pressure of 0.06 megapascal, and allowed to react for 2 hrs. Thereafter, the reactor was stepwise heated to 230° C. in an hour, with the vacuum degree of 1000 pascal, and allowed to react for 5 hrs, to yield a first prepolymer PBAT with a weight-average molecular weight of 60000.

B. 90 g of L-lactic acid was added to another reactor. The reactor was protected by nitrogen, heated to 110° C., vacuumized to the pressure of 0.08 megapascal, and stirred for 4 hrs. Thereafter, 9 mg of stannous chloride dehydrate and 6.6 mg of terephthalic acid were added and stepwise heated to 160° C. in 2 hrs. The reactor was vacuumized to the pressure of 1000 pascal, and allowed to react for 5 hrs, to yield a second prepolymer PLA with a weight-average molecular weight of 50000.

C. The first prepolymer PBAT obtained in A) and the second prepolymer PLA obtained in B) were uniformly blended and put into a vacuum reactor. The vacuum reactor was vacuumized to the pressure of 100 pascal, heated to 100° C., and allowed to react for 0.5 h. The reactants were stepwise heated to 145° C. in 2 hrs, and allowed to react for 5 hrs, to yield a final product PBAT-PLA with snow-white color. Refer to the curve A in FIG. 1, calculation showed that the copolyester PBAT-PLA of this example had a weight-average molecular weight of 100000. The molar ratio of the first prepolymer PBAT and the second prepolymer PLA was 1:10.

Example 2

A. 146 g of adipic acid, 97 g of dimethyl terephthalate, and 135 g of 1,4-butanediol were added to a reactor. The reactor was protected by nitrogen and heated to 160° C. After the reactants in the reactor were melted completely, 37.8 mg of tetrabutyl titanate was added. The reactor was vacuumized to the pressure of 0.02 megapascal, and allowed to react for 2 hrs. Thereafter, the reactor was stepwise heated to 220° C. in 2 hrs, with the vacuum degree of 500 pascal, and allowed to react for 4 hrs, to yield a first prepolymer PBAT with a weight-average molecular weight of 90000.

B. 90 g of L-lactic acid was added to another reactor. The reactor was protected by nitrogen, heated to 120° C., vacuumized to the pressure of 0.02 megapascal, and stirred for 2 hrs. Thereafter, 180 mg of stannous chloride dehydrate and 132 mg of terephthalic acid were added and stepwise heated to 175° C. in 2 hrs. The reactor was vacuumized to the pressure of 800 pascal, and allowed to react for 4 hrs, to yield a second prepolymer PLA with a weight-average molecular weight of 80000.

C. The first prepolymer PBAT obtained in A) and the second prepolymer PLA obtained in B) were uniformly blended and put into a vacuum reactor. The vacuum reactor was vacuumized to the pressure of 5 pascal, heated to 110° C., and allowed to react for an hour. The reactants were stepwise heated to 155° C. in an hour, and allowed to react for 5 hrs, to yield a final product PBAT-PLA with snow-white color. Refer to the curve B in FIG. 1, calculation showed that the copolyester PBAT-PLA of this example had a weight-average molecular weight of 250000. The molar ratio of the first prepolymer PBAT and the second prepolymer PLA was 10:1.

Example 3

A. 73 g of adipic acid, 194 g of dimethyl terephthalate, and 135 g of 1,4-butanediol were added to a reactor. The reactor was protected by nitrogen and heated to 150° C. After the reactants in the reactor were melted completely, 2.01 g of tetrabutyl titanate was added. The reactor was vacuumized to the pressure of 0.04 megapascal, and allowed to react for 2 hrs. Thereafter, the reactor was stepwise heated to 210° C. in an hour, with the vacuum degree of 800 pascal, and allowed to react for an hour, to yield a first prepolymer PBAT with a weight-average molecular weight of 40000.

B. 90 g of L-lactic acid was added to another reactor. The reactor was protected by nitrogen, heated to 130° C., vacuumized to the pressure of 0.06 megapascal, and stirred for an hour. Thereafter, 274 mg of stannous chloride dehydrate and 176 mg of terephthalic acid were added and stepwise heated to 190° C. in 2 hrs. The reactor was vacuumized to the pressure of 500 pascal, and allowed to react for an hour, to yield a second prepolymer PLA with a weight-average molecular weight of 30000.

C. The first prepolymer PBAT obtained in A) and the second prepolymer PLA obtained in B) were uniformly blended and put into a vacuum reactor. The vacuum reactor was vacuumized to the pressure of 20 pascal, heated to 105° C., and allowed to react for an hour. The reactants were stepwise heated to 150° C. in 2 hrs, and allowed to react for 6 hrs, to yield a final product PBAT-PLA with snow-white color. Refer to the curve C in FIG. 1, calculation showed that the copolyester PBAT-PLA of this example had a weight-average molecular weight of 180000. The molar ratio of the first prepolymer PBAT and the second prepolymer PLA was 5:5.

Example 4

Steps A and B are the same at that in Example 1 except that the catalyst A in step A is titanium chloride, and the catalyst B in step B is diethyl zinc and mesylate.

C. The first prepolymer PBAT obtained in A) and the second prepolymer PLA obtained in B) were uniformly blended and put into a vacuum reactor. The vacuum reactor was vacuumized to the pressure of 80 pascal, heated to 108° C., and allowed to react for 0.5 h. The reactants were stepwise heated to 145° C. in 1.5 hrs, and allowed to react for 10 hrs, to yield a final product PBAT-PLA with snow-white color. Refer to the curve C in FIG. 1, calculation showed that the copolyester PBAT-PLA of this example had a weight-average molecular weight of 200000. The molar ratio of the first prepolymer PBAT and the second prepolymer PLA was 3:7.

Example 5

Steps A and B are the same at that in Example 2 except that the catalyst A in step A is tetraisopropyl titanate, and the catalyst B in step B is tetraphenyl tin and p-chlorobenzenesulfonic acid.

C. The first prepolymer PBAT obtained in A) and the second prepolymer PLA obtained in B) were uniformly blended and put into a vacuum reactor. The vacuum reactor was vacuumized to the pressure of 40 pascal, heated to 110° C., and allowed to react for 1 hr. The reactants were stepwise heated to 145° C. in 1.5 hrs, and allowed to react for 8 hrs, to yield a final product PBAT-PLA with snow-white color. Refer to the curve C in FIG. 1, calculation showed that the copolyester PBAT-PLA of this example had a weight-average molecular weight of 220000. The molar ratio of the first prepolymer PBAT and the second prepolymer PLA was 4:6.

Example 6

Steps A and B are the same at that in Example 3 except that the catalyst A in step A is tetrabutyl titanate and tetraisopropyl titanate, and the catalyst B in step B is zinc powder and 1-propanesulfonic acid.

C. The first prepolymer PBAT obtained in A) and the second prepolymer PLA obtained in B) were uniformly blended and put into a vacuum reactor. The vacuum reactor was vacuumized to the pressure of 60 pascal, heated to 110° C., and allowed to react for an hour. The reactants were stepwise heated to 155° C. in 1.5 hrs, and allowed to react for 10 hrs, to yield a final product PBAT-PLA with snow-white color. Refer to the curve C in FIG. 1, calculation showed that the copolyester PBAT-PLA of this example had a weight-average molecular weight of 150000.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for synthesizing a polybutylene adipate terephthalate-polylactic acid (PBAT-PLA) copolyester, comprising:
   uniformly blending a first prepolymer PBAT and a second prepolymer PLA to yield a mixture;
   putting the mixture in a vacuum reactor, then vacuuming the vacuum reactor to a vacuum degree of between 5 and 100 pascal and heating the vacuum reactor to a temperature of between 100 and 110° C., for allowing to react for between 0.5 and 1 hr at the vacuum degree of between 5 and 100 pascal and temperature of between 100 and 110° C.;
   stepwise increasing the temperature to be between 145 and 155° C. in between 1 and 2 hrs, and allowing to react for between 5 and 10 hrs at the temperature between 145 and 155° C., to yield a PBAT-PLA copolyester with a weight-average molecular weight of between 100000 and 250000.

2. The method of claim 1, wherein a weight ratio of the first prepolymer PBAT to the second prepolymer PLA is 1-10: 1-10.

3. The method of claim 1, wherein the first prepolymer PBAT is prepared as follows: adding adipic acid, dimethyl terephthalate, and 1,4-butanediol in a molar ratio thereof of 1-2:1-2:2-4 to a reactor, charging nitrogen to the reactor, and heating the reactor to a temperature of between 140 and 160° C.; allowing materials in the reactor to melt, and adding a catalyst A; vacuumizing the reactor to a pressure of 0.02-0.06 megapascal, and allowing to react for 1-2 hrs at the temperature of between 140 and 160° C. and the pressure of pressure of 0.02-0.06 megapascal; stepwise increasing the temperature to be between 210 and 230° C. in between 1 and 2 hrs, controlling the vacuum degree at between 500 and 1000 pascal, allowing to react for 1-5 hrs at the temperature between 210 and 230° C. and the pressure of between 500 and 1000 pascal, to yield the first prepolymer PBAT.

4. The method of claim 3, wherein an addition amount of the catalyst A accounts for 0.01-0.5% of that of reactants in the reactor by weight.

5. The method of claim 4, wherein the catalyst A is a titanium-containing catalyst which is selected from tetrabutyl titanate, tetraethyl titanate, tetraisopropyl titanate, titanium chloride, titanium dioxide, or a mixture thereof.

6. The method of claim 5, wherein the catalyst A is tetrabutyl titanate.

7. The method of claim 1, wherein the second prepolymer PLA is prepared as follows: adding L-lactic acid to a reactor, performing nitrogen replacement three times, heating the reactor to a temperature of between 110 and 130° C., vacuumizing the reactor to a pressure of 0.02-0.08 megapascal, and stirring for 1-4 hrs; adding a composite catalyst B to the reactor, stepwise increasing the temperature to be between 160 and 190° C. in between 1 and 2 hrs, continuing vacuumizing the reactor to a pressure of between 500 and 1000 pascal, allowing to react for 1-5 hrs at the temperature between 160 and 190° C. and the pressure of between 500 and 1000 pascal to yield the second prepolymer PLA.

8. The method of claim 7, wherein the composite catalyst B comprises a primary catalyst and a cocatalyst with a molar ratio thereof of 1:1, and an addition amount of the primary catalyst accounts for 0.01-0.5% of that of reactants by weight.

9. The method of claim 8, wherein the primary catalyst is a tin-containing catalyst or a zinc-containing catalyst; the tin-containing catalyst is selected from stannous octoate, stannous chloride dihydrate, stannous oxide, stannous chloride, tetraphenyl tin, or a mixture thereof; the zinc-containing catalyst is selected from zinc powder, diethyl zinc, zinc octoate, zinc oxide, zinc chloride, or a mixture thereof; the cocatalyst is one or more organic sulfonic compounds selected from mesylate, ethanesulfonic acid, 1-propanesulfonic acid, p-toluenesulfonic acid and p-chlorobenzenesulfonic acid.

10. The method of claim 9, wherein the primary catalyst is stannous chloride dihydrate, and the cocatalyst is p-toluenesulfonic acid.

11. The method of claim 2, wherein the first prepolymer PBAT is prepared as follows: adding adipic acid, dimethyl terephthalate, and 1,4-butanediol in a molar ratio thereof of 1-2:1-2:2-4 to a reactor, charging nitrogen to the reactor, and heating the reactor to a temperature of between 140 and 160° C.; allowing materials in the reactor to melt, and adding a catalyst A; vacuumizing the reactor to a pressure of 0.02-0.06 megapascal, and allowing to react for 1-2 hrs at the temperature of between 140 and 160° C. and the pressure of pressure of 0.02-0.06 megapascal; stepwise increasing the temperature to be between 210 and 230° C. in between 1 and 2 hrs, controlling the vacuum degree at between 500 and 1000 pascal, allowing to react for 1-5 hrs at the temperature between 210 and 230° C. and the pressure of between 500 and 1000 pascal, to yield the first prepolymer PBAT.

12. The method of claim 2, wherein the second prepolymer PLA is prepared as follows: adding L-lactic acid to a reactor, performing nitrogen replacement three times, heating the reactor to a temperature of between 110 and 130° C., vacuumizing the reactor to a pressure of 0.02-0.08 megapascal, and stirring for 1-4 hrs;

adding a composite catalyst B to the reactor, stepwise increasing the temperature to be between 160 and 190° C. in between 1 and 2 hrs, continuing vacuumizing the reactor to a pressure of between 500 and 1000 pascal, allowing to react for 1-5 hrs at the temperature between 160 and 190° C. and the pressure of between 500 and 1000 pascal, to yield the second prepolymer PLA.

\* \* \* \* \*